United States Patent [19]

Kornylak

[11] 4,278,624
[45] Jul. 14, 1981

[54] FLUID FILM CONTINUOUS PROCESSING METHOD AND APPARATUS

[75] Inventor: Andrew T. Kornylak, Hamilton, Ohio

[73] Assignee: Kornylak Corporation, Hamilton, Ohio

[21] Appl. No.: 954,448

[22] Filed: Oct. 25, 1978

[51] Int. Cl.³ .................... B29D 27/04; B65G 53/02; B29C 25/00

[52] U.S. Cl. ..................... 264/37; 264/40.3; 264/40.6; 264/40.7; 264/45.4; 264/51; 264/83; 264/216; 425/4 C; 425/89; 425/115; 425/144; 425/145; 425/149; 425/182; 425/224; 425/817 C; 425/DIG. 2

[58] Field of Search .............. 425/4 C, 90, 96, 101, 425/DIG. 2, DIG. 115, 89, 115, 144, 145, 149, 182, 224, 817 C; 264/50, 51, 53, 40.3, 40.6, 40.7, 45.4, 45.8, 83, 216, 37

[56] References Cited

U.S. PATENT DOCUMENTS

| | | | |
|---|---|---|---|
| 2,135,763 | 11/1938 | Nicholson | 425/DIG. 2 |
| 2,387,886 | 10/1945 | Devol | 425/DIG. 2 |
| 2,537,977 | 1/1951 | Dulmage | 264/53 |
| 2,736,056 | 2/1956 | Toulmin | 425/DIG. 2 |
| 2,774,991 | 12/1956 | McCurdy et al. | 264/53 |
| 2,909,804 | 10/1959 | Means | 425/107 |
| 2,956,308 | 10/1960 | Schulken et al. | 264/83 X |
| 3,240,846 | 3/1966 | Voelker | 425/115 X |
| 3,242,244 | 3/1966 | Maly | 264/83 |
| 3,408,690 | 11/1968 | Jacob | 425/371 X |
| 3,466,705 | 9/1969 | Richie | 264/50 X |
| 3,527,851 | 9/1970 | Bulgin | 264/40.3 |
| 3,594,461 | 7/1971 | Jacob | 425/371 X |
| 3,617,338 | 11/1971 | Caiola et al. | 264/83 X |
| 3,617,594 | 11/1971 | Willy | 425/115 X |
| 3,754,064 | 8/1973 | Snelling et al. | 425/4 C X |
| 3,816,043 | 6/1974 | Snelling et al. | 425/4 C |
| 3,888,608 | 6/1975 | Holl | 425/817 X |
| 3,952,407 | 4/1976 | Aupoix et al. | 264/83 X |
| 3,954,929 | 5/1976 | Hoenke | 264/51 |
| 3,973,893 | 8/1976 | Camp | 425/371 X |
| 3,981,666 | 9/1976 | Wadman | 425/371 |
| 3,992,135 | 11/1976 | Camp | 425/371 X |
| 4,008,030 | 2/1977 | Ampler | 425/371 X |
| 4,049,760 | 9/1977 | Lozach | 264/51 |
| 4,069,292 | 1/1978 | Herrington et al. | 264/40.3 |
| 4,097,565 | 6/1978 | Cole et al. | 264/40.3 |
| 4,120,924 | 10/1978 | Rainville | 264/40.3 X |
| 4,140,460 | 2/1979 | Carlsen | 264/40.3 X |

FOREIGN PATENT DOCUMENTS

| | | | |
|---|---|---|---|
| 47-24269 | 7/1972 | Japan | 425/817 C |
| 51-68674 | 6/1976 | Japan | 425/817 C |
| 1049923 | 11/1966 | United Kingdom . | |
| 1216259 | 12/1970 | United Kingdom . | |

Primary Examiner—Philip Anderson
Attorney, Agent, or Firm—Thomas E. Beall, Jr.

[57] ABSTRACT

Material such as panels, boards, and flexible sheets are produced and processed while passing between two or more surfaces at least one of which has a thin layer of pressurized fluid in direct contact with the product. While in this process zone, the item is shaped, coated, smoothed, textured, heated, cooled, compressed, dried, and/or impregnated. For example, expandable resin is deposited in a continuously formed bag of upper and lower sheet material so that the resin may expand and cure as it is drawn in through a fixed rigid mold having upper and lower (and perhaps side) porous material walls through which pressurized fluid is passed to provide a fluid bearing support and molding surface. The temperature, pressure and flow of the fluid is monitored and controlled separately at spaced locations along the length of the mold to control curing rate, foaming rate, surface characteristics and resistance of material moving through the mold. The surfaces may be planar or curved and may be parallel or variably separated in lateral cross-section. They may also be planar or curved and parallel or variably separated in longitudinal cross-section. The fluid layer is formed by passing a fluid under pressure through a porous wall having the shape of the desired fluid film configuration. This film of fluid moves across the surface of the item being processed, separating the item from the wall to eliminate sliding friction while subjecting the item to pressure, and/or heat, heat loss, absorption, evaporation and impingement.

66 Claims, 7 Drawing Figures

FLUID FILM CONTINUOUS PROCESSING METHOD AND APPARATUS

BACKGROUND OF THE INVENTION

Apparatus for continuously molding expandable synthetic resin, such as foam polyurethane, either rigid or flexible is well known and usually employs opposed endless belts that form a moving mold for confining and carrying the material as it foams and cures. These molds have a disadvantage of high initial cost and considerable power required to drive the belts that must necessarily be of heavy construction to resist the high foaming pressure. It is necessary to occasionally move the upper and lower belts away from each other for cleaning or repair, and accordingly the support for the upper belt is usually made so that the upper belt may be bodily moved. In view of the heavy and movable mounting for such rigid belt conveyors, it is difficult to control conditions within the mold, such as those of pressure and temperature.

Opposed belt conveyors have been used for:

1. The compression and adhesion of loose materials such as fibers, particles and crumbs into blocks and sheets. 2. The continuous molding of sheets and blocks of chemically produced materials such as urethane foam.

3. The lamination of skins to such blocks or sheets to produce panels with protective or decorative surfaces.

4. The direct production of laminated panels by combining such skins with the chemicals needed to produce the cellular core and restraining the expansion of the core to produce accurate and uniform thickness.

5. Restraining the rise of cellular products by conveying an open mold on a belt conveyor and utilizing a second belt to contact the top of the mold with enough pressure to resist the foaming pressure of the product.

In most cases there is a need for heat transfer either for warming or cooling the product as called for by the process. This is accomplished by controlling the temperature of the belt. This indirect means of applying or removing heat is very inefficient, has limitations of heat transfer and is not practical where both heating and cooling are required in separate zones of the process. Because of the pressures encountered it is necessary that the belt be of massive construction, resulting in high cost, high heating and cooling requirements and high power requirements for movement of the belt. The structure required for mounting such belts and their adjustment is also massive and expensive. Often the chemical reaction is so rapid that chemicals must be laid down adjacent to the nip of the two conveyors. This is very inconvenient for the operation of the chemical lay down equipment and the nipping itself is a safety hazard to operating personnel. Other problems which have been incurred are the rapid wear of the rollers needed to support the two belts against the product pressure and the low life expectancy of the bearings and other moving items when subjected to the high temperatures incurred in the process. Disassembly for cleaning and repair is also tedious.

SUMMARY OF THE INVENTION

Objects of the present invention are to provide for highly efficient and rapid heat transfer to or from a product in or moving through a compressing or shaping zone, to eliminate contact of the product with the confining zone walls, to provide facilities for moisturizing, impregnating, drying, smoothing, texturizing and/or laminating of the product mixture. These objects are achieved by providing a stationary zone consisting of restraining walls at least one of which is a moving fluid film in direct contact with the product, which walls may be rigid or flexible.

These and other objects are achieved by providing stationary molding surfaces with fluid bearings that may be constructed far lighter and more cheaply when compared to pressure resistant endless belt conveyors. Pressure and temperature within the mold are controllable by varying the corresponding pressure and temperature of the air provided through the mold space bearing holes. Various surface textures may be formed on the final product by pulsating or otherwise varying the conditions of the fluid films, or varying the hole locations for the fluid. The drive and driving power are simplified and reduced, respectively, by providing such fluid bearings and a simple product mover such as driven pinch rolls acting upon the cured final product.

DETAILED DESCRIPTION

Figure 1:
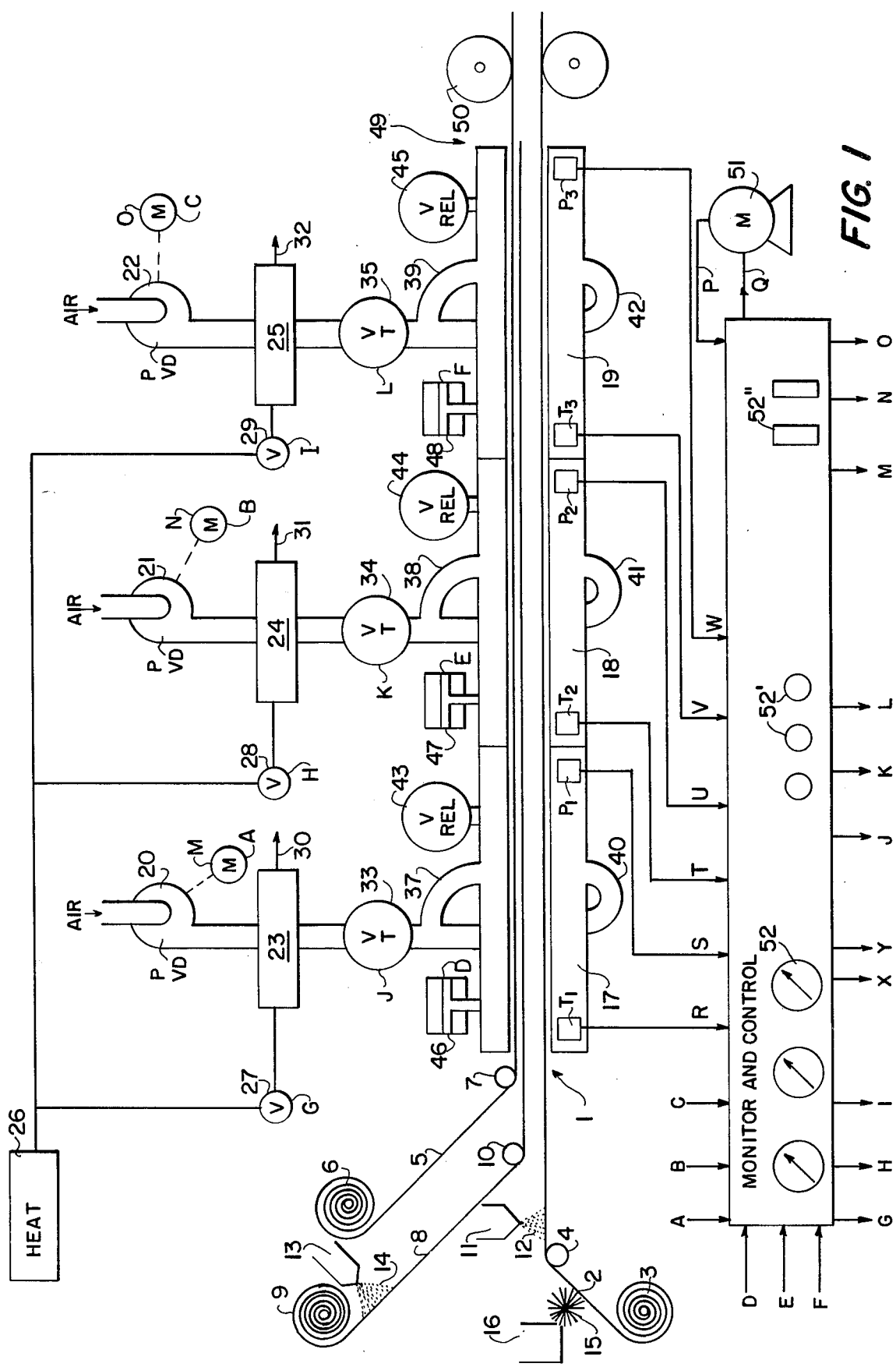
FIG. 1 is a schematic side elevation view of apparatus employing features and operating according to the method of the present invention.

For the apparatus shown in FIG. 1, a product laminated of outer and central webs of sheet material, such as paper or thin film synthetic resin, and rigid synthetic resin, such as polyurethane, is continuously formed and cured. At the entrance end 1 of the apparatus, web material forming the lower laminate 2 is fed from a supply coil 3 and guided by roll 4 into the entrance end 1, an outer upper laminate 5 of web material is fed from a coil supply 6 around a guide roller 7 and into the entrance end 1 of the apparatus, and a central laminate of web material 8 is fed from a coil supply of such material 9 around the guide roll 10 between the upper laminate 5 and lower laminate 2 into the apparatus entrance end 1.

A conventional mixing head and nozzle 11 is employed to lay down a mixture of foamable chemicals 12 on the upper surface of the laminate 2, and a similar mixing head and nozzle 13 will lay down the same or different mixture of foamable chemicals 14 on the upper surface of the central laminate 8. By way of example, these foamable chemicals may be such that they will foam, when mixed, and cure (accelerated by heat) to produce polyurethane foam type expanded resin. Prior to passing the guide roll 4, a brush 15 receives adhesive from a supply 16 and spreads the adhesive on the two opposite marginal edges of the laminate 2, so that at the entrance end 1 of the apparatus, pinch rollers (shown in FIG. 2) provided at each marginal edge will squeeze the lower laminate 2 and the upper laminate 5 together at their marginal edges (with central laminate 8 being of less width than the lower laminate 2 and upper laminate 5), so as to close the marginal edge of the laminates and form a partitioned continuous bag at the entrance end 1 of the molding apparatus with foamable chemicals inside.

The conveying portion of the apparatus is divided into a plurality of sections, with three sections being specifically shown for purposes of illustration, such sections being a first section 17 wherein the foamable resin rises and attains its final height, a second section 18 wherein the foamable resin exerts a considerable amount of pressure on the apparatus (for example 3–5 psi), and a final curing section 19, where the foamed material is at least partially cured. Additional sections may be provided for greater control. These sections 17, 18, and 19 are constructed of opposed rigidly supported plenum chambers, which are generally rectangular in configuration and abut each other so as to form an upper mold planar support surface and a correspondingly-shaped lower mold planar support surface, each having the length as shown and a width so as to extend for at least the full width of the bag 2, 5 formed at the entrance end 1 of the apparatus.

Each of these plenums is porous or has a pattern of holes or nozzles in its surface facing the bag 2, 5 that will direct compressed air from within the plenum outwardly against the upper laminate 5 and lower laminate 2 so as to form respective air bearings for the bag 2, 5 moving through the apparatus continuously from left to right in FIG. 1. For each one of the sections 17, 18, 19, air is compressed in pumps 20, 21, 22, respectively.

Figure 5:
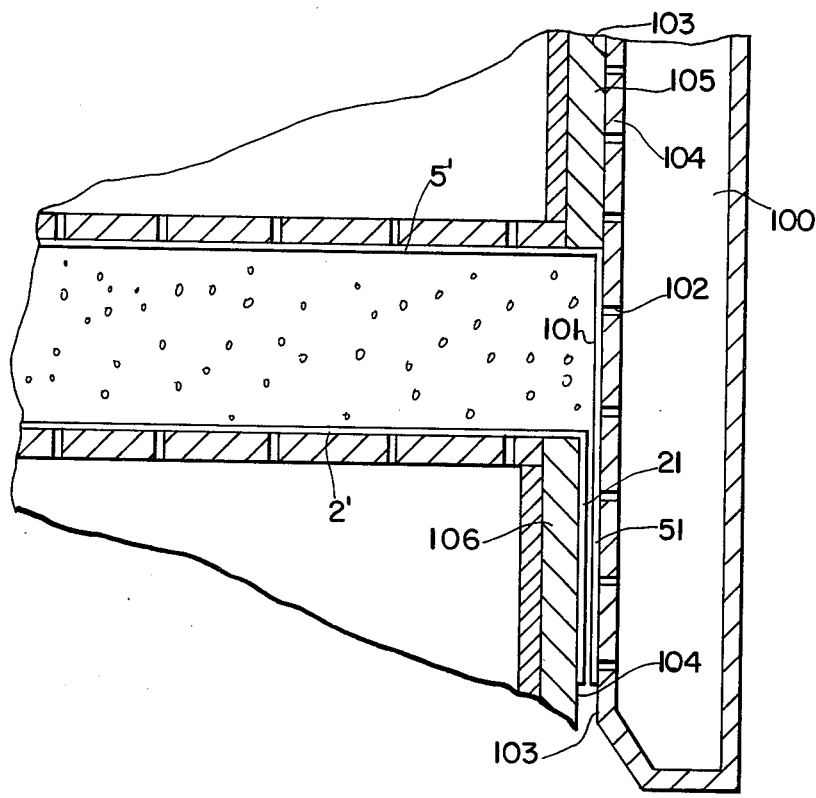
FIG. 5 is a partial cross-sectional view similar to FIG. 4, but of a further embodiment for the side closure of the mold.

Instead of separate pumps 20, 21, 22, a single pump may be employed, for example an eight—stage compressor having a capacity of 2 cubic feet per minute at a temperature of 180° F. may be employed and driven by a 100 horsepower motor. Thus a single compressor could provide the needed air for all of the plenums as shown in FIG. 5.

Whether a separate compressor is provided for each of the plenums, or whether a single compressor is provided so that its output is divided into branches for the respective plenums, each of the plenums is provided with a heat exchanger 23, 24, 25, respectively, each of which, if needed, will cool or further heat the air being fed to its respective plenum, independently of the other heat exchangers and be controlled so as to produce a selected temperature within the respective plenums. This controlled heat exchange is provided by a source 26 of heated or refrigerated fluid that is individually fed to the entrance of each of the heat exchangers 23, 24, 25, under the control of corresponding adjustable throttle valves 27, 28, 29 that will individually control the flow of heat exchange fluid. After passing through the heat exchanger, the heat exchange fluid will exit at 30, 31, 32, respectively to a sump for the heat exchange fluid or be discharged to the environment. The throttle valves 27, 28, 29 are each individually controlled by a solenoid or other electric motor that will infinitely or stepwise adjust such valves as controlled by an electric signal fed at G, H & I into the respective control electric lines for valves 27, 28, 29. Thus the temperature of the air fed to the plenums is adjustable.

The high pressure air that exits from the separate heat exchangers then passes through respective air throttle valves 33, 34, 35 where the pressure of the air being supplied to the plenums 17, 18, 19 is individually controlled with a stepwise or infinite adjustment, each under the independent control of an electric motor (built into the valve) operated by electrical signals J, K, L through the indicated control lines, respectively. Thus the pressure of the air fed to the plenums is controllable.

Figure 6:
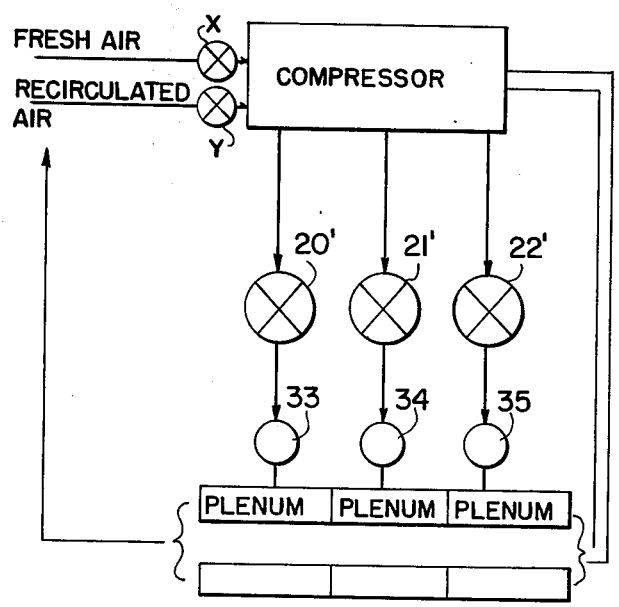
FIG. 6 is a schematic illustration of a portion of FIG. 1 showing a variation in the construction of FIG. 1.

The volume flow of air being fed to the plenums 17, 18, 19 is regulated by electrical signals M, N, O that are respectively fed to the electric motors driving the pumps or compressors 20, 21, 22 respectively so as to control the speed of such motors. Of course, if only a single compressor was employed as in FIG. 6 then such motors would operate flow control valve 20',21',22'. Suitable sensors, such as motor current sensors, will determine the speed of each of the motors and provide feedback speed signals A, B, and C which will be indicative of the motor speed and correlated to the volume flow of compressed air to the plenums respectively.

Each of the plenums 17, 18, 19 is divided into an upper plenum and a lower plenum, with the air being delivered from the respective throttle valves 33, 34, 35 being divided by branch lines 37, 38, 39 that feed to the upper plenums, respectively and branch lines 40, 41, 42 that feed to the lower plenums respectively. Pressure relief valves 43, 44, 45 are respectively provided for the plenums to relieve any over pressure as a safety measure.

The lower plenums are fixedly supported, whereas the upper plenums are movable between a lower molding position at a fixed distance from the lower plenum, for example, one inch to an upper repair position where they are greatly spaced from the lower plenum, for example, one foot, or to intermediate positions for different height products. The upper plenums are moved between such positions by hydraulic or pneumatic cylinders 46, 47, 48. Each of the cylinders 46, 47, 48 is provided with pressurized fluid as indicated, although they could be double acting cylinders for raising and clamping pressure. The pressure within such cylinders is monitored so as to produce pressure signals D, E, F respectively for each of the cylinders 46, 47, 48, which pressure signals will be correlated to the pressure of the foam resin in the respective mold sections between the plenums.

After complete curing or at least partial curing, the foam resin product leaves the exit end 49 of the molding apparatus, where it passes drive rolls 50 which are driven by means of a motor 51. The drive rolls may provide the sole motive force for pulling the product through the molding apparatus. If desired, the product leaving the molding apparatus may be partially cured and the drive rolls configured to as to provide a three dimensional texture to the surface of the product. Electrical signal Q controls the speed of the motor 51, whereas electrical signal P provides a speed feedback signal, all in a conventional manner for motor controls.

Within the plenum 17, there is a temperature sensor T1 and a pressure sensor P1, which produce and feed respective electrical signals R and S; within the plenum 18, there is a temperature sensor T2 and a pressure sensor P2, respectively producing and feeding correlated electrical signals T and U; and in the plenum 19, there is a temperature sensor T3 and a pressure sensor P3, which respectively produce and feed correlated electrical signas V and W. All of the electrical signals A through W are either fed through or eminate from a central monitor and control. The central monitor and control is composed of conventional components per se, and may include one or more gauges or readouts 52, or warning lights 52', or switches 52".

Figure 2:
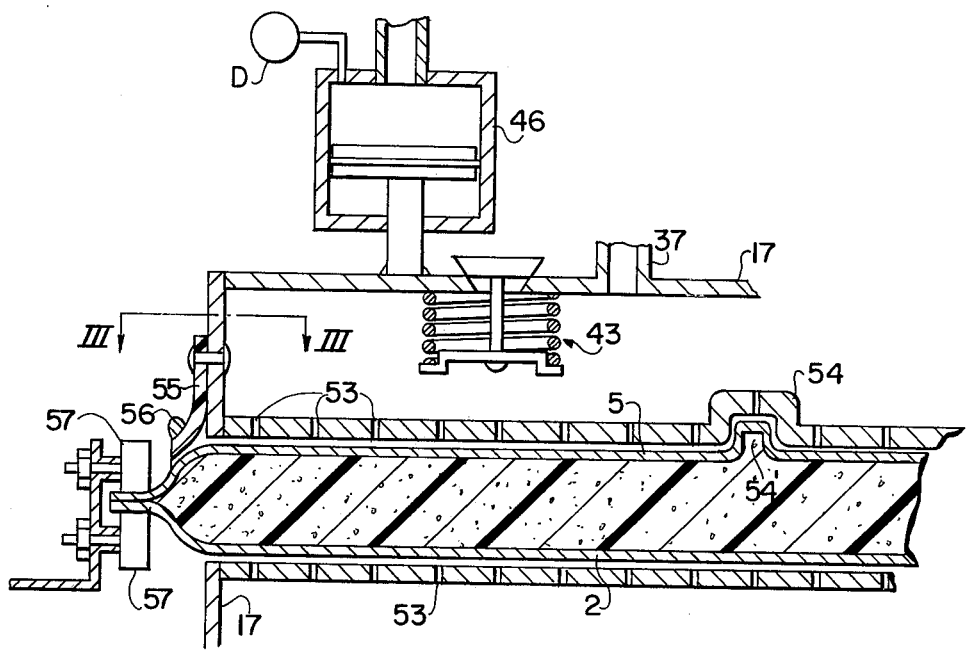
FIG. 2 is a partial cross-sectional view through the apparatus of FIG. 1 and taken on a plane perpendicular to the plane of FIG. 1.
Figure 3:
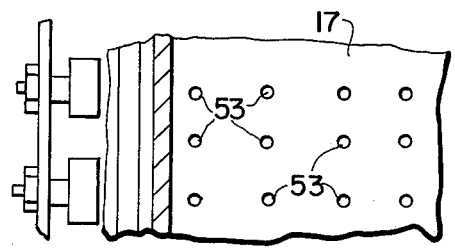
FIG. 3 is a partial cross-sectional view taken along line III—III of FIG. 2.
Figure 4:
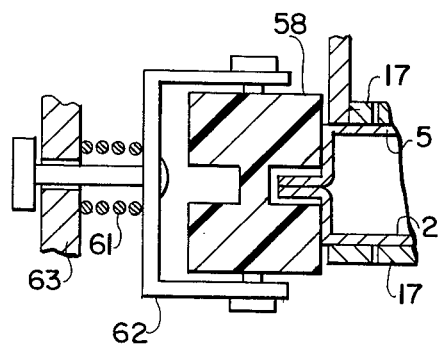
FIG. 4 is a partial cross-sectional view of a portion of FIG. 2 showing an alternative mold side arrangement.

As shown in FIG. 2, the bottom wall of the upper plenum and the upper wall of the lower plenum are each provided with a plurality of holes, which may be uniform bores or configured nozzles, 53 that forms an air bearing for the product as it moves through the mold. The holes or nozzles 53, as shown in FIG. 3, are arranged in a pattern so that adjacent holes are staggered in the direction of product travel, the longitudinal direction. If all of the holes were arranged in a rectangular grid having one direction of the grid parallel to the direction of movement through the mold, the air holes could produce a corrugated effect on the final product, which if desired is sufficient, but which most likely is undesirable. To overcome this when it is undersirable, it is a feature of the present invention to provide at least three and preferable five or more adjacent holes spaced from each other in the longitudinal direction before any two of such nozzles or holes become aligned in the longitudinal direction.

As seen in FIG. 2, the plenum wall may be configured, as at 54, to provide a surface configuration 54' in the final product, for example, a longitudinally extending ridge. It is to be understood that the cross-sectional shape of the plenums is constant throughout the length of the mold, because the process is continuous. While one side of the plenum has been shown, it is understood a similar structure would be provided on the opposite side.

To assist in maintaining the air bearing pressure, it is preferable to employ a resilient strip 55 secured to each side wall of the plenum and extending longitudinally for the full length of the mold. This resilient strip 55 is provided with an inherent bias or as shown a weighted strip or a plurality of weights 56 at its lower edge so as to maintain it in close proximity to the top surface of the product and to confine the air. If desired, a similar strip (not shown) may be provided for the bottom plenum to be spring urged against the product.

As previously mentioned, the glued marginal edges on each side of the bag are squeezed together by means of pinch rollers 57, which are formed in pairs of vertically aligned rollers and which pairs extend along the marginal edges of the mold from adjacent guide roll 7 a distance towards the exit end 49 for a distance at least long enough to bond the edges sufficiently to resist the subsequent foaming pressure. These rollers may be on fixed horizontal axes or spring urged together to clamp therebetween the marginal edges of the top sheet 5 and bottom sheet 2. If the adhesive is sufficiently strong, only a single set of pinch rolls need be provided only at the entrance end 1 of the mold.

As the bag exits from the pinch rollers where the side edges are bonded together and prior to curing, a plurality of configured rollers 58 having vertical axes extend along the entire remaining sides of the mold so as to form the side of the product into a shape that is more nearly square, and which will need less trimming and wastage of material than if the configuration shown in FIG. 2 were maintained for the final product. The roller 58 is spring urged into the product and plenums as shown by means of a coil compression spring 61 operating between a bracket 62 for the roller axle and a portion 63 of the apparatus frame.

With the present invention, there may be monitoring and control independently at spaced locations along the length of the mold of the air pressure and therefore bearing effect, air temperature and therefore curing effect, air flow and therefore air bearing and surface texture effect, conveying speed and therefore curing time, and plenum support pressure and therefore obstruction and overpressure within the product, for example. Many different effects may be obtained. For example, sudden high pressure pulses may be fed to the plenums to produce dimples in the product at locations corresponding to the air holes in the plenums. The air holes may all be aligned in the longitudinal direction (contrary to the showing in FIG. 3) and an excess air pressure fed so as to produce a corrugated surface on the product.

Preferably, the pressure relief valves will be standard pop valves designed to limit the maximum pressure within the plenums, for example to 10 psi, gauge. Preferable, the pressure within the plenums is maintained between 2 and 10 psi gauge, and most preferably between 3 and 8 psi gauge, with the exact pressure being varied during the process so as to produce the desired effect. It is contemplated that 10 or 20 plenums along the 20 to 100 ft. length of the molding apparatus would be employed, with the length of the plenums toward the entrance end being greater than the lengths of the plenums toward the exit end, but in any event the lengths of the plenums may be varied so as to produce the desired fine control of the above-mentioned parameters where desired. At the entrance end, it would be most desirable to provide very little air pressure, since the foam is expanding at this point, and for the top no air pressure may be needed. Towards the center portion of the apparatus length, the most air pressure would be needed because of the high pressures that may be obtained, for example, 5 psi gauge within the foam when it reaches its full height. It may be desirable to provide the greatest heat toward the exit end, for final curing. It may be necessary to provide the greatest flow of air towards the entrance end, because of large gaps being formed. In any event, it can be seen that the desired characteristics that will be needed vary between products and may be easily obtained with the present apparatus.

The cover sheets 5 and 2 are preferably impervious to the air flow, although they may be slightly porous.

By way of specific examples, the top and bottom cover sheets may be constructed of Kraft paper, metal foil, such as aluminum foil, light cardboard, rolled sheet steel, or rigid synthetic resin sheet material.

The specific foamable chemicals may be beads that when heated will expand to produce rigid bead board, or they may be chemicals that will be mixed so as to chemically react and produce gases to foam the chemicals. By way of example, the final product may be a foamed rigid polyurethane. Materials, solvent and the like are well known in the molding art, and any such materials may be used, for example those disclosed in the prior art relating to continuous molding apparatus.

With some chemicals, relatively low temperatures may be sufficient for the curing and processing within the time limits desired, and the above-mentioned multistage compressor may be used with cooling heat exchange to reduce its output temperature to the desired fixed levels, with the temperature within the various sections being within the range of 160° to 180° F., and such may easily be obtained. With other chemicals, or to obtain faster curing, higher temperatures may be desired. In such cases, the present invention includes the capture of the compressed gases as they escape from the mold and their recirculation into the compressor, so that with a small amount of make-up gases, the output temperature of the compressor may be raised to 300° F. or 350° F.; the high temperature output of the compressor may then be reduced as needed for the individual sections. The exchangers may specifically be water-cooled heat exchangers or air-cooled heat exchangers, so long as they have adjustable controls. If the output of the compressor has a temperature that is too low for a specific section, the heat exchanger may in fact heat the compressor output, for example by means of electric heaters. Preferably, the gas being compressed by the compressor and fed to the air bearings is air, but it is contemplated that other gases may be employed, e.g., nitrogen, or that will chemically react with the product.

The cover sheets are preferably impervious to the air bearing fluid, but they also may be pourous, because they in fact would not transmit the air bearing fluid there through due to the equal pressure of the foaming chemicals. Most likely, the air pressure within the first one or two stages could be completely turned off since the chemicals would be rising and not in need of support, and in fact support may be undesirable. Alternatively, the air pressure within the first few sections may be adjusted to press the rising chemicals before they reach their final height so as to adjust the density of the foam.

The cylinders that raise and lower the top molding surface may be either hydraulic or air, and either single or double acting.

The use of an intermediate sheet material sandwiched within the foam can produce such products as a laminate of paper, polyester foam, paper, urethane foam, and paper, which would have usage as a fire resistant building panel. In such a lamination, it may be possible to eliminate the middle layer of paper if uniform foam layers can be produced. Another example of a laminated product to be produced with the present invention, would be that of a thin layer of polyester fiber glass filtered with an intumescent material, and then covered with a foamed rigid urethane, with a thickness of the intumescent material being adequate to meet fire exposure times established by various codes and other requirements. For fire resistance on both sides of the panels, the polyester and intumescent material may be applied at a mezzanine level above the line and then laid down on top of the foam layer.

The gas supplied in the air bearing would all be exhausted along the sides of the apparatus. Back pressure may be suitably controlled by recirculation of these gases, but if the gases are exhausted directly to the environment, it is then most desirable to employ the above-mentioned side sealing lips to provide sufficient back pressure and to control the exhausting of the gases, particularly to prevent jet grooving along the sides of the material being produced.

In accordance with FIG. 5, the construction of the side closure and the construction of the side sealing for the bag may be varied, but otherwise the construction of the entire apparatus is the same as that previously described. In FIG. 5, a side air plenum 100 is provided with a molding surface 101 having a plurality of holes 102 communicating between the plenum 100 and the interior of the mold so as to support, with an air bearing, the side of the product being formed and to provide for straight side walls and square corners in the product. In the forming of the product, the top cover sheet 5' may be bent with suitable rolls, not shown, but well known in the prior art, so as to form downturned side edges that will overlap with correspondingly bent and downturned side edges of the lower cover sheet 2' along each side edge of the apparatus. These downturned side edges will overlap, as shown, and effectively form a seal where they first meet to prevent the escape of the foaming material within the bag formed by the cover sheets 5' and 2'. As a specific example, the space between the side support surface 103 of the wall forming the plenum 100 and the adjacent surface 104 may be ¼", with the layers of overlapping cover sheets being approximately 3/16", so that the cover sheets will not be clamped and therefore may be free to move longitudinally with the product, while the air escaping through the holes 102 adjacent the overlapped cover sheets will prevent escape of the foam resin. At the top, there will be no space between the surface 103 and the adjacent surface 104. It is also a feature of the present invention that shims may be employed, such as top shim 105 and bottom shim 106. By way of example, these shims may be ½" thick, so that when they are removed, the product will be 1" less in width (shims being employed on both sides of the apparatus). According to this construction, there would be no adhesive between the overlapped portions of the top and bottom cover sheets 5', 2'.

The holes in the plenums used to transmit the air from the platens to the space between the platen and the product to form a thin controlled film of air (with it being understood that other gases may be used), may take on many different actual constructions. In the simpliest form, these holes would be straight uniform diameter bores extending generally perpendicular to the molding surface. Also, these bores may be angled to provide for predominate movement of the air, forward to assist in feeding the product; outward for maintaining the cover sheets tightly stretched, and for other purposes. Also, it is contemplated that specifically shaped nozzles may be employed, for example Coanda nozzles. When used in this environment, such nozzles have the unusual property of providing, in addition to the controlled characteristic air film mentioned above, the characteristic of drawing the cover sheet towards the platen when a spacing between the cover sheet and platen exceeds a fixed amount. This is particularly advantageous with respect to the top cover sheet, because such nozzles may be employed to hold the top cover sheet adjacent to the top platen while the foamable chemicals lie entirely below and out of contact with the top cover sheet as they rise, and thus the rise of the chemicals may be truly a free rise without any hindrance provided by the top cover sheet or air bearing until the chemicals reach almost an entire full rise at which time they will engage the top cover sheet. Such a result has been obtained with actual experimentation. All of the holes may be constructed according to a single construction, or various constructions may be employed for different sections, or each section may employ various nozzle constructions, according to the characteristics desired. Such various constructions, by way of example, for the holes are shown in FIGS. 7 & 8.

Figure 7:
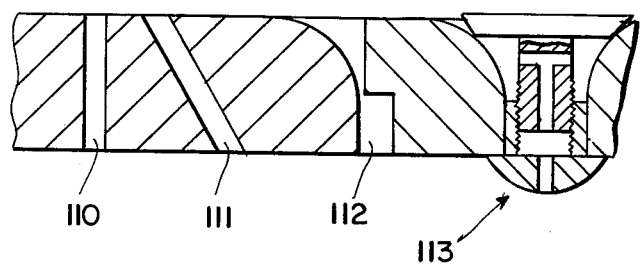
FIG. 7 is an enlarged cross-section of wall.

In FIG. 7, a straight perpendicular hole 110 is shown for a first type of hole; a slanted equal diameter bore is shown at 111 for a second type of hole, a fixed Conada nozzle 112 is shown as a third type of hole, and a variable or adjustable Coanda nozzle 113 is shown as a third type of hole, and other holes or nozzles may be employed. With respect to nozzle 112, the air will exit and generally flow towards the left to provide for the Coanda effect, and the representative cross section is constant throughout the transverse dimension of the nozzle. With respect to the nozzle 113, the entire nozzle is symmetrical with respect to an axis perpendicular to the platen, and is constructed of two members threadably engaged to adjust the outlet aperture; the nozzle may float in the contoured opening in the plenum wall plate, because the exiting air will force the nozzle moveable portions upwardly as shown due to the difference in air pressure. In FIG. 7, air is introduced into the plenum below the holes, and exits upwardly through the holes to form the air film for the support and control of the product.

The principal component in the continuous manufacture of foam resin core panels is a flat fluid film of controlled pressure, temperature and zone location. The shaping of the product, moving of the product and restriction of the growth of the product are all controlled by the process according to the transfer of heat. Control of heat transfer is accomplished by controlling both the volume flow of fluid and its temperature. The progression of the product formation, with respect to foam expansion, completed rise, and degree of curing may be detected according to the measurement of the product's internal pressure, which may be obtained from the cylinder pressure holding the top platen downward at each zone location, or the plenum pressure at each zone, or a combination of these. Both the temperature and pressure are adjustable within each zone to accommodate the process conditions while changes are made elsewhere in the product line to regulate the process.

Due to the use of Coanda nozzles, the top cover sheet may be held closely adjacent the top platen without any other support other than the suction effect of the Coanda nozzles until the foamed chemicals rise up to meet the top sheet, so that the foam rise will be unhibited. Also, the Coanda nozzle may be used to stretch and smooth the top cover sheet or paper transversely, or to give some forward movement to the product or cover sheet to reduce the power requirements for feeding the material.

A considerable amount of water is created during the chemical process, with respect to some foamable chemicals. The moving air film between the product and the platens will carry away such moisture from the product as it is formed.

The fluid film is formed between the upper and lower surface of the product and the rigid platens. The fluid, particularly air, is introduced to the platen surface through one or more perforations in each platen. The air temperature is controlled to suit process requirements. The compressed air enters the perforations from a chamber or channels which are directly opened to the surface via perforations or holes. The air is compressed to a pressure that will produce an air film sufficient in pressure to slightly higher in pressure than the internal proouduct pressure, so as to provide an air bearing support within the desired zone, which pressures will vary from zone to zone due to the degree of rise, foaming or curing. When the process and the air film conditions are in proper balance, the product will flow without friction between the upper and lower platens. In this state, the air film is quite small, for example, 0.010" thick and the product is thereby produced with an extreme accurate thickness, with both external surfaces being smooth and planar. In this frictionless mode, the product can be pulled through the process by light frictional contact with motor driven rolls at the output end of the process line, although other traction means have been considered.

The air film that is in direct contact with the product on both sides permits accurate and direct temperature control, thus improving product quality. Since there is no intervening belt, as in prior art devices, to impede heat flow, or act as a heat sink which transfers heat from zone to zone, the temperature control is immediate and precisely responsive. The present invention also offers the advantage of rapid heat transfer to thus accelerate the process of curing and foaming. This permits higher operating speeds than the prior art, which can be easily accommodated since the frictionless flow of the product offers low limitations to the length of the molding apparatus. Therefore, for the same residence time of the product in the molding apparatus, the speed of the product passing through the molding apparatus can be increased to an extent limited only by the length of the molding apparatus. With respect to prior art rigid-type belt conveyors used to form the molding apparatus, speed is greatly limited with respect to the inertia of the rigid slat (heavy gauge metal) conveyor sections moving through an arc 180° at each end of the apparatus. Also with respect to this type of prior art, changes in speed and therefore accurate control are extremely difficult, again due to the inertia of the apparatus, which is increased proportionate to the length of the apparatus or its width.

To the effect of the present apparatus, the speed can be great as compared to the prior art and the response time for an adjustment of speed to correct for errors and the like or to adjust for variable heating times, are greatly improved due to the absence of any moving parts other than the product itself. Since the product is extremely light (primarily composed of foam resin), there is very little inertia and the product can be started or stopped or changed in speed almost instantaneously. Therefore, changes in the product speed can be very responsive to changed characteristics or conditions within the product itself as determined by the various monitors. Thus, if the internal pressure indicators show that there is an unbalance in the process, corrections can be made by changing the product speed. For example, if curing is not completed or at least not completed to a fixed limit by the time the product reaches a particular zone, the speed of the product moving through such zone may be immediately reduced to bring the process in balance, while other corrections are made such as in the temperature of the air film upstream of such points, and then when the change in temperature of the air film produces a greater curing effect, the speed of the product may again be increased.

Other significant changes can be made in temperature, rate of chemical feed, chemical distribution and chemical proportioning. The product emerging from the apparatus thus may be produced under optimum conditions with respect to foaming, curing, foam density, and the like to result in ideal cell structure, accuracy and uniform density, as well as accuracy in thickness and optical flatness of both surfaces.

A fully cured and stable product will emerge at higher speeds and from a shorter apparatus than previously possible.

Zone control of temperature permits a temperature profile throughout the apparatus, both in the longitudinal direction and the transverse direction, which will accurately match the chemical requirements of the materials being processed. While a change in such conditions longitudinally of the apparatus is obvious, from the foregoing remarks, it may be seen that it is also desirable to zone the temperature pressure transversely of the apparatus, when its width may be 8 or 10 feet, because the heat transfer to the environment may be greater at the edges or the may be like variables. The higher, more efficient heat transfer of the present invention permits the production of materials that have been difficult to produce by other systems with more limited heat transfer methods, for example, ISOCYANURATE. The shortening of the line that is possible with the present invention and the ease with which it can be lengthened by simply adding more platens offers the possibility of a production line built on skids, in a container or on a vehicle incorporating chemical and skin dispensing process controls, and complete wiring and piping so that production can be started with a minimum of set-up and preparation.

In its simpliest form, the platen consists of air boxes, each with a molding surface provided by a plate that is thick enough and provided with enough reinforcement to control deflection within the tolerance limitations of the product to be formed. Ribbing and other reinforcement is preferably constructed internally of each plenum, and the outer surface of the platen is ground to a smooth, flat, accurate finish. Pressurized and heating air is introduced into the box through a properly sized pipe fitting. All surfaces of the box, except the platen surface, are thermally insulated to maintain temperature control and to prevent energy loss.

Three methods have actually been tried for producing the desired air film. One is by perforating the platen with small holes (a successful hole pattern is 0.030" diameter holes on a rectangular grid of 3 inches between holes, with this grid being skewed from the center line of the molding apparatus so that air impinging on the product will not follow a straight line and thereby corrugate the product). A second method is a slot basically along the center line of the molding apparatus, which also can be slightly skewed to protect the product from the formation of corrugation by air impingement. The slot is approximately 0.015" wide. The slot will provide laminar flow of the air film since the air introduced at the center line flows laterally to each edge of the molding apparatus. The third type of nozzles or holes involve the Coanda nozzles. These nozzles can be of circular configuration, for example, nozzle 113 when viewed perpendicular to the molding surface, or a rectangular configuration such as nozzle 112; eperiments show that with such a nozzle construction, air is directed along the surface of the platen to thereby produce a suction somewhat central of the nozzle. This feature will enhance the laminar flow of air as it is introduced from successive rows of nozzles or holes from the center line of the molding apparatus outwardly towards the sides.

In many of the platen designs, arrangements are made to keep the air pressure at at least a minimum value needed to maintain an air film. This is particularly important in the first few platens where the foam exerts little or no pressure and is still quite fragile. The back pressure may be controlled by flaps or recirculation of the gas.

Although the air has been referred to as heated air, new forms of synthetic resin foam may require the use of cold air in one zone or more than one zone, for cooling purposes.

The platen structure, in both depth and wall thickness, is such that it will maintain reasonable flatness while controlling internal product pressure up to 5 psi (such should have the capability of resisting 10 psi, as some chemicals will produce higher pressure than others) for urethane. Experiments show that the film pressure is a fraction of the air pressure within the plenum. Since the ratio between the film pressure and the plenum pressure is a fixed ratio for any specific set of conditions, the film pressure may be calculated from a measurement of the plenum pressure, to maintain a frictionless air film. This film pressure is an indication of the internal pressure within the product and can be used, with suitable multiplying ratios, as an indication of the condition of the chemicals, with respect to their rise or curing, for example, and therefore used to monitor the process and to produce monitoring values that may be compared electronically by conventional control equipment to fixed desired values for adjusting, in a preferred order, other factors such as speed, temperature and pressure. Also, it is possible to employ transducers extending through the platen surface opening directly to the air film, so that the air film pressure may be measured directly.

To further enhance the capability of the molding apparatus and to report the conditions, the platens are divided into zones. Each of these zones has its own pressure and temperature characteristics. The platen which forms one of the walls of the molding apparatus can be zoned by the introduction of lateral bulkhead walls inside of the chamber to form the individual plenums and additional with provision of separate air enough for each such plenum. Another method is to produce the platens in separate sections that may thereafter be bolted or otherwise held together. This latter method has the advantage of easier production and handling in addition to the flexibility afforded by adding or subtracting platens to suit resident time requirements or molding length requirements. A desirable assembly of platens is achieved by mounting the lower run of platens on a frame using shims, wedges or adjusting screws to achieve an accurate level assembly from one end of the apparatus to the other. While vertically aligned zones should normally be treated the same, there will be some differences with respect to the weight of the product, that will have to be adjusted for, for instance, by providing a suitable throttle for the common air supply to, for example, the top one of the aligned plenums. Also, there should be some separate adjustment for the air characteristics being supplied to the molding apparatus sides as compared to the immediately adjacent top and bottom plenums. The upper platen or platens simply rest on accurately machined spacer pads and the clamps are used to hold the upper platen down.

While the present invention has been specifically described with respect to an embodiment employing cylinders for raising the upper platens and lowering them to clamp them or hold them in position, it may be possible to eliminate such provisions and allow the upper platens to merely be clamped in place, and if they need be removed they can be unclamped and disassembled, or if an adjustment need be made in the thickness of the product, shims may be employed in the clamping. Thus, an accurate and fixed relationship between the upper and lower walls of the panels is maintained. The shims employed to change the thickness in panels may be accurately machined shims in fixed increments, for example tenths of an inch and inches, so that they may be added or subtracted between the upper and lower platens to change the thickness of the product being formed. It is also contemplated that the platens may be hinged, so that one end may be unclamped and the platen may be pivoted away for quick removal of the upper platen for inspection, maintenance or cleaning of the apparatus in the event of, for example, an accident. The two vertical walls, or side walls, of the apparatus will be equivalent in width to the thickness of the product, or they may be of a width, as measured in the vertical direction, equal to at least the maximum contemplated thickness of the product to be formed and overlap the top and bottom platens as shown in the drawing so it could be usable with any thickness of product. Also, the side walls could be entirely omitted and no side restraint provided so that merely the bag would retain the foam and thereafter the final product could be trimmed along its sides if desired. Also, it is contemplated that the side walls should be provided by members fixedly secured to either the upper or lower platens or to the machine frame.

Among the many variables that significantly affect product quality and production rate are the ratio of chemicals used, their temperatures, the manner in which the chemicals are distributed between skins, the temperature of the skins, the rate of skin movement, the pressures to which the processing materials are subjected, the temperature of the materials during cream, rise, and cure, the accuracy of the restraining or molding surface, the flatness of the surfaces, the absence of relative movement or vibration of these surfaces to prevent disturbing the cell structure, and the length of time allowed for each of the phases of the chemical reaction.

For each product, the higher quality and lowest production cost is achieved by adhering to an optimum set of the above conditions. Beginning with a specific formulation, it is possible to establish a profile of temperature and pressure versus time which represent an ideal processing sequence. This profile can reasonably be duplicated in the present apparatus by varying the air temperature, air flow, product conveying speed, pumping rates and lay down patterns of the chemicals, and air pressure, many of which variables may be varied both longitudinally and transversely of the apparatus. In addition to controlling the temperature and pressure, the profile duplication is further achieved by allotting more or less platens to any particular temperature and pressure zone. When properly reacted according to the optimum conditions, the material will display a predictable profile of internal pressure versus time or distance travelled through the apparatus, since the apparatus is already precalibrated to indicate internal pressure relating to the minimum pressure necessary to maintain a frictionless air film. This measurement of the air plenum pressure can be used to control most of the significant corrections within the apparatus.

The presence of a frictionless air film is detected grossly by the torque needed to move the product through the apparatus. More specifically, the presence of a frictionless air film is detected by the rate of air flow into each plenum, whether these plenums be individual platens or bulkhead separated single platens. When it is found that a frictionless air film no longer exists an immediate correction is made to increase the air pressure (within a safe range) until an overall correction is made in the entire system, which could be a gross correction in correlation to the monitoring of the power needed to pull the product through the molding apparatus. This correction or corrections in any of the factors named above would be decided through a mini-computer or micro-processor programmed with the fixed characteristics of the material being used in the process line, for example, the reaction curve of the chemicals, and fixed ratios between measured quantities and correlated desired quantities. Further, the control could be programmed so as to make changes in the entire process according to a specific preferred sequence under different conditions, and thereby monitor and control chemical temperatures, proportioning ratios, pumping rates of the chemicals, lay down pattern of the chemicals, product speed through the apparatus (not necessarily the same as tractor speed of the pulling mechanism), etc. Should the micro-processor fail to accomplish a correction of the line, the line could be instantaneously stopped with no harm done to any part of the equipment, because of the low inertia. Operating personnel could then examine the product, the chemicals and machinery conditions to determine what adjustments would be needed. Due to the nature of the construction, the molding apparatus therefore offers a more automated approach to panel production with built-in features to assure quality and quantity with a minimum of waste through trial and error, miscalculation or judgment than heretofore possible.

Through experimentation, molding rates of 2 and 3 times the rates normally obtained with existing belt machinery have been obtained with a high accuracy in thickness and density of the product. The density feature is important because the chemicals are expensive and the cost is directly proportional to the density of the material. However, if the density is reduced below the desired standard, then the quality of product is diminished. It is desired to therefore accurately run the apparatus with the minimum density, and to provide for uniform density throughout the thickness of the product.

Since the present design is devoid of moving parts for the apparatus, this permits almost an unlimited width of the panels that can be produced, since it is only a simple structural design to maintain controlled deflection of the platen. With the prior art, the practical limitation of apparatus width was 12', but with the present invention, modules can be laterally stacked to provide greater widths, for example a 20' wide apparatus. Where previously the moving metal belt design presented a tolerance problem in the range of plus or minus 0.090", the present invention can easily maintain tolerances of plus or minus 0.010" for the product. This feature plus the absence of slat marks for rigid slat conveyors makes it very practical to produce extremely thin panels, and by experimentation panels have actually been accurately produced as thin as 3/16".

A number of lay down systems may be employed with the present apparatus, for placing the chemicals, after they are mixed, onto the lower cover sheet. New chemicals may be laid down in a single puddle, a zigzag ribbon, a stationary fan spray, or in a reciprocating spray. All of these systems are compatible with the present apparatus. Further, the chemicals may be laid down in a froth after they have been partially expanded. One machine may be equipped with a dispensed station mounted with wheels running on two tracks to permit the station to be located at any desired distance from the entrance to the apparatus, which distance may be adjusted to provide for a further control in the final product. Further, a spreading roll or doctor blade may be provided between the chemical laid down and the entrance to the molding apparatus; such a roller or doctor is conventional, and will meter the thickness of the liquid film passing through it and thus spreading out any irregularities in the liquid laid down.

The present apparatus may include a rise control rib, that is a flexible slat supported horizontally, adjacent and downstream of the dispense or lay down station for the chemicals, which is then allowed to drape down on top of the upper surface of the foamable chemicals. Such a rib would be very light in weight, and the top surface of the flap would be ribbed laterally using hollow plastic tubing to maintain lateral stiffness without reducing the flexibility along the center line dimension. Such a system might improve the cream and early rise of the foamable chemicals and would take the place of the first set of platens where air jet damage to the foam is critical. Alternatively, Coanda nozzles could be employed for the first few platens during the critical rise stage so as to maintain the cover sheet sucked up against the top platen and away from the rising chemical, and in turn to maintain the pressurized air away from the rising chemical by recirculation to assist the unhibited rise of the chemicals up to the positioning of the top cover sheet that would be close to the final rise height.

The fluid that is used to form the film bearing may also be a reactant with the product, that is it may enter into a chemical reaction with the contacted portions of the product. For Example, in forming a synthetic foamed resin sheet, the fluid inherently or by means of a carried substance or chemical may react with the outer surface of the product to produce a particularly hard skin, and in such a case a cover sheet would of course not be used between the product and the wall forming the plenum chambers In such cases, and in others, it would be particularly desirable to recirculate the fluid to recover the unused chemicals. Also, recirculation is advantageous so that impurities in the fluid may be removed, for example, if the fluid is removing moisture formed by the product reacting, the moisture may be removed in a dehumidifier prior to the fluid being recirculated. The fluid film could be that of air, vapor, liquid, steam, carbon dioxide, neon, alcohol, each of which could be a reactant or hot or cold with respect to the material treated.

The various characteristics of the fluid film, for example, temperature, pressure, flow rate, chemical content, pulsations, or the like may be varied from section to section both longitudinally of the apparatus and transversely of the apparatus, so that adjacent sections may have entirely different fluid characteristics.

In the present specification, the wall or plate between the plenum chamber and the process area of apparatus has been characterized as having holes, with such holes having specific embodiments as described above. This terminology is to include the structures that may be variously characterized as porous, or otherwise capable of passing fluid through them so as to form the fluid film on the processing or mold surfaces. Such porosity may be obtained with a felted metal sheet or a sintered metal sheet.

With respect to controlling temperature of the product as it passes through the apparatus, the fluid film is a very effective means of controlling heat transfer, particularly if there is no intervening cover sheet or the like structure between the fluid film and the product. Therefore, higher temperatures may be obtained on the product surface, heat transfer is improved due to the convection caused by the product moving relative to the fluid film, more accuracte temperature control is obtained because of the direct contact or near direct contact with a thin cover sheet, it is easier to change the temperature of the product, because there is no thermal inertia of any intervening rigid metal belts, thick belts, or the like and if a cover sheet is used, it would be quite thin and have very small thermal inertia. As mentioned above, the temperature of the fluid film may vary in various zones or sections both transversely and longitudinally along the apparatus. With such a direct heat transfer being so efficient, there is less heat wastage. Further, the power consumed in the apparatus for heating will be quite small when a compressor, particularly a multi-stage compressor with gas recirculation is used, because in such a case the inherent heating of the fluid during compression may supply all of the necessary heat. Due to the direct contact with relative movement between the fluid film and product, with at most the thin intervening cover sheet, the transfer of heat is very quick to the product when compared with prior art apparatus employing moving conveyors of a belt type.

As a result of the various advantages gained with the present invention, the apparatus may be quite short in length and able to process materials not otherwise capable of economically being processed on a continuous basis.

Another advantage of the present invention over prior belt-type conveyors, is that there are no belt marks to be left on the product. Also, the thickness accuracy is approximately ten times greater than that obtained with belt conveyors.

With the monitoring of the various characteristics of the fluid film and power consumed, a very close, accurate and direct monitoring of the final product is obtained at various points along the apparatus, and on an automated basis the monitor signals can be checked and compared, for example by means of differential amplifiers, with fixed reference signals (which may be manually changed as desired) to obtain differential control signals that are then usable in conventional control apparatus with feed back to actually change the characteristics of the fluid film.

While the preferred embodiment is that of molding a foamed synthetic resin endless web or sheet and carrying it within the apparatus, further uses are contemplated according to the broader aspects in the present invention. A sheet of paper may be formed at the entrance end of the apparatus, dried, coated by means of a liquid carried in the film, have its coating dried, and even polished by the moving film as it passes through the apparatus. While an endless web has been discussed as a product for the present apparatus, according to the broader aspects of the apparatus, an endless conveyor having a form of a ladder with a height less than the spacing between the surfaces of the apparatus may be employed to move separate items to be processed through the apparatus.

While drive pinch rolls have been specifically illustrated for engaging the product at the exit end of the apparatus and pulling the product into the apparatus, it is to be understood that the product may be further moved through the apparatus, when it is an endless web, by frictionally engaging its sides at various points 4. The method according to claim 2, including providing said fluid as a pressurized gas uniformly, with respect to the width of said web, along the upper surface of said web within said first section to press the rising foam and adjust its distribution before it reaches its final height.

5. A method of processing a product with a fluid film, comprising the steps of:
providing a fluid under pressure;
providing a product to be processed by the fluid;
providing a confining wall having a general shape of the final desired shape of the product on one side;
passing the fluid through the confining wall to form a thin film fluid processing and bearing film on said one side of said confining wall;
controlling the characteristics of the fluid;
directly contacting the thin fluid film with the product immediately adjacent said confining wall to prevent direct contact between said product and said confining wall and further to directly process the product according to the controlled characteristics of the fluid;
monitoring the temperature of the fluid film and producing a corresponding temperature monitor signal;
providing a temperature reference signal;
comparing the temperature reference signal with the temperature monitor signal and producing a correlated differential temperature signal; and
automatically varying the temperature of the fluid film in correlation to said temperature differential signal.

6. The method according to claim 5, wherein said step of providing a product provides chemicals, mixes them and deposits them at an entrance end of said confining wall, moves said chemicals in a conveying direction to a first section of said confining wall from said entrance end so that they will rise and attain a fixed final height of synthetic foam resin, conveying said foam resin from said first section through a second section of said confining wall and processing and conveying said resin to an exit end of said confining wall to complete the curing of said resin so as to produce an indefinite length continuous web of rigid synthetic foam resin;
said steps of providing a temperature reference signal, comparing and automatically varying all maintaining the temperature of the fluid within said film within the range of 100° to 180° and transferring heat directly between said fluid of said film and the resin.

7. The method of claim 6, wherein said preceding steps maintain said film of fluid at a maximum 0.010 inch thick, as measured perpendicular to said confining wall, between said product and said confining wall at least within said second section.

8. The method of claim 6, including providing said fluid as a pressurized gas uniformly, with respect to the width of said web, along the upper surface of said web within said first section to press the rising foam and adjust its distribution before it reaches its final height.

9. A method of processing a product with a fluid film, comprising the steps of:
providing a fluid under pressure;
providing a product to be processed by the fluid;
providing a confining wall having a general shape of the final desired shape of the product on one side;
passing the fluid through the confining wall to form a thin film fluid processing and bearing film on said one side of said confining wall;
controlling the characteristics of the fluid;
directly contacting the thin fluid film with the product immediately adjacent said confining wall to prevent direct contact between said product and said confining wall and further to directly process the product according to the controlled characteristics of the fluid;
monitoring the fluid flow of the fluid film and producing a corresponding flow monitor signal;
providing a fluid flow reference signal;
comparing the fluid flow reference signal with the fluid flow monitor signal and producing a correlated differential fluid flow signal; and
automatically varying the fluid flow of the fluid film in correlation to said fluid flow differential signal.

10. The method of claim 9, wherein said step of providing a product provides chemicals, mixes them and deposits them at an entrance end of said confining wall, moves said chemicals in a conveying direction to a first section of said confining wall from said entrance end so that they will rise and attain a fixed final height of synthetic foam resin, conveying said foam resin from said first section through a second section of said confining wall and processing said resin in said second section to a substantially rigid product, and conveying said substantially rigid foam product to an exit end of said confining wall to complete the curing of said resin so as to produce an indefinite length continuous web of rigid synthetic polyurethane foam resin, including providing said fluid as a pressurized gas uniformly, with respect to the width of said web, along the upper surface of said web within said first section to press the rising form and adjust its distribution before it reaches its final height.

11. The method of claim 10, wherein said preceding steps maintain said film of fluid not exceeding 0.010 inch thick, as measured perpendicular to said confining wall, between said product and said confining wall.

12. A method of processing a product with a fluid film, comprising the steps of:
providing a fluid under pressure;
providing a product to be processed by the fluid;
providing a confining wall having a general shape of the final desired shape of the product on one side;
passing the fluid through the confining wall to form a thin film fluid processing and bearing film on said one side of said confining wall;
controlling the characteristics of the fluid;
directly contacting the thin fluid film with the product immediately adjacent said confining wall to prevent direct contact between said product and said confining wall and further to directly process the product according to the controlled characteristics of the fluid;
engaging said product and exerting a propelling force on said product mechanically in a direction to move the product along the fluid film;
monitoring the power consumed to move the product mechanically and producing a correlated monitor power signal;
providing a reference power signal;
comparing the reference power signal to the monitor power signal and producing a differential power signal correlated to the difference between the two; and or continuously along the apparatus, by exerting a force in the feed direction through shaped or slanted holes through which the fluid passes, or by using small pinch type rollers along the sides of the apparatus that will engage the sides of the product, for example the overlapping edges of the bag discussed above.

The word "continuous" as used herein, means capability of having a moving line type production with an entrance end and an exit end for the line, but movement of the product or products between such entrance and exit may be discontinuous. For example, the product may be intermittently moved so as to advance from one section correspondingly to a section of the plenum chambers or from one zone corresponding to a plurality of such sections or partial sections, to another section or zone respectively, with the residence time in each section or zone determining the amount of processing. Also, with automatic control, the line could be slowed or stopped to gain the desired processing. In addition to this stoppage or slowing down in the line, there may be controlled variations of the fluid flow, temperature, and pressure in addition, or the fluid compression on the product. All of this is usable for either batch operation, or for shortening of the process line. That is, the process line may be shortened by increasing the residence time at the various zones or sections.

With batch operation, one batch may be processed when another batch is dispensed, mixed, manipulated, or otherwise pre-processed prior to entering the apparatus of the present invention.

Advantages of the thin fluid processing include the direct control of the fluid film to control the pressure or surface characteristics as they relate to the product, heat exchange, or chemical reaction if the fluid contains a chemical reactant. Movement of the film will correspondingly control speed of such surface processing, heat exchange and chemical reaction.

While recirculation of the fluid has the advantage of conservation of heat, there is the further advantage of conserving the fluid when the fluid is expensive, for example when it might be a gas other than air, such as an inert gas, or when the gas or other fluid includes a catalyst or chemical that enters into reaction with the product which is expensive. With the present apparatus, it is very easy to clear or reprocess the fluid for reuse or discharge. It is also easy to change the type of fluid or its temperature, or its flow rate, or its pressure, which contributes to versatility of the apparatus.

According to the present invention, all of the variables are subject to automatic control, which automatic control can be in response to control signals sent to control the variables in a predetermined order of preference or predetermined fixed order, as determined by a comparison of one or more monitor signals with fixed reference signals, which fixed reference signals in turn may be varied manually or automatically to gain different desired characteristics or to accommodate different products and fluid.

The walls on which the fluid film is formed may be rigid or they may be flexible to yield or follow an expanding material such as a free foaming resin while providing some shaping. The wall may be of a porous material such as sintered or expanded metal, or synthetic resin.

As a further variation, the individual plenums may have removable, adjustable legs so that standard units may be connected in series, so that the plenum walls and such legs or other support means would be the frame, or a floor or table could constitute a frame or base.

Instead of being automatic the controls may be manual.

While a preferred embodiment of the present invention has been illustrated in detail, not only for purposes of illustrating the present invention as required and the advantages of the details, but with it being kept in mind that modifications, variations and further embodiments other than those specifically discussed are comtemplated according to the broader aspects of the present invention exemplified by the above, all is determined by by spirit and scope of the following claims.

It is claimed:

1. A method of processing a product with a fluid film, comprising the steps of:
   providing a fluid under pressure;
   providing a product to be processed by the fluid;
   providing a confining wall having a general shape of the final desired shape of the product on one side;
   passing the fluid through the confining wall to form a thin film fluid processing and bearing film on said one side of said confining wall;
   controlling the characteristics of the fluid;
   directly contacting the thin fluid film with the product immediately adjacent said confining wall to prevent direct contact between said product and said confining wall and further to directly process the product according to the controlled characteristics of the fluid;
   monitoring the pressure of the fluid film and producing a corresponding pressure monitor signal;
   providing a pressure reference signal;
   comparing the pressure reference signal with the pressure monitor signal and producing a correlated differential pressure signal; and
   automatically varying the pressure of the fluid film in correlation to said pressure differential signal.

2. The method according to claim 1, wherein said step of providing a product provides chemicals, mixes them and deposits them at an entrance end of said confining wall, moves said chemicals in a conveying direction to a first section of said confining wall from said entrance end so that they will rise and attain a fixed final height of synthetic foam resin, conveying said foam resin from said first section through a second section of said confining wall and heating said resin in said second section to a substantially rigid product, and conveying said substantially rigid foam product through a final third section of said confining wall to an exit end of said confining wall to complete the curing of said resin so as to produce an indefinite length continuous web of rigid synthetic foam resin;
   conducting said steps of providing a pressure reference signal, comparing, and varying so that the pressure within said thin film of fluid is less than 3 psig within said first section, and said pressures increasing from said first to said second sections to accommodate the process profile of the product;
   providing said confining wall and said fluid film at least on both the top and bottom surfaces of said web simultaneously throughout at least one section, and at least partially on the bottom of said first section.

3. The method of claim 2, wherein said preceding steps maintain said film of fluid at a maximum of 0.010 inch thick, as measured perpendicular to said confining wall, between said product and said confining wall.

controlling at least one characteristic of the fluid film in direct response to and correlated to the differential power signal.

13. The method of claim 12, wherein said step of providing a product provides chemicals, mixes them and deposits them at an entrance end of said confining wall, moves said chemicals in a conveying direction to a first section of said confining wall from said entrance end so that they will rise and attain a fixed final height of synthetic polyurethane foam resin, conveying said foam resin from said first section through a second section of said confining wall and processing said resin in said second section to a substantially rigid product, and conveying said substantially rigid foam product to an exit end of said confining wall to complete the curing of said resin so as to produce an indefinite length continuous web of rigid synthetic foam resin; and maintaining said film of fluid not exceeding 0.010 inch thick, as measured perpendicular to said confining wall, between said product and said confining wall at least within said second section, and providing said fluid as a pressurized gas uniformly, with respect to the width of said web, along the upper surface of said web within said first section to press the rising foam and adjust its distribution before it reaches its final height.

14. A method for processing a continuous, indefinite length web of material with a processing fluid film, comprising the steps of:

providing a rigid, confining wall elongated in a conveying direction and provided with a working surface along the length and having a transverse width;

feeding the indefinite length web along said surface in the conveying direction;

providing a film of processing fluid between the adjacent surfaces of said web and said working surface in direct contact with said web of material to be processed so as to simultaneously contact the material of the web with the fluid, space the web generally parallel and closely to the working surface while supporting the same and preventing contact between the web and the working surface; and chemically reacting the material of the web at its surface facing said working surface with the fluid.

15. The method of claim 14, including the further step of passing the fluid through the working surface to form said film, exiting the working fluid from the film from between said web and working surface, collecting the exiting fluid and recirculating the same through said working surface and into said film.

16. The method of claim 15, further including the step of removing impurities from the fluid immediately prior to said step of recirculating.

17. The method of claim 16, further including the step of circulating a catalyst in a closed fluid loop with the processing fluid to thereby improve said chemical reaction between the fluid and the material of the web.

18. The method of claim 15, further including the step of circulating a catalyst in a closed fluid loop with the processing fluid to thereby improve said chemical reaction between the fluid and the material of the web.

19. A method of processing a product with a fluid film, comprising the steps of:

providing a fluid under pressure;
providing a product to be processed by the fluid;
providing a confining wall having a general shape of the final desired shape of the product on one side;
passing the fluid through the confining wall to form a thin film fluid processing and bearing film on said one side of said confining wall;
controlling the characteristics of the fluid;
directly contacting the thin fluid film with the product immediately adjacent said confining wall to prevent direct contact between said product and said confining wall and further to directly process the product according to the controlled characteristics of the fluid;
wherein said step of providing a product provides chemicals, mixes them and deposits them at an entrance end of said confining wall, moves said chemicals in a conveying direction to a first section of said confining wall from said entrance end so that they will rise and attain a fixed final height of synthetic foam resin, conveying said foam resin from said first section through a second section of said confining wall and processing said resin in said second section to a substantially rigid product, and conveying said substantially rigid foam product to an exit end of said confining wall to complete the curing of said resin so as to produce an indefinite length continuous web of rigid synthetic polyurethane foam resin;
monitoring the quantity of mixed chemicals deposited on said confining wall at the entrance end and producing a correlated signal;
monitoring the proportion of mixed chemicals deposited at said entrance end and producing a correlated signal;
monitoring the flow of fluid within said thin film and producing a correlated signal;
conducting at least some of said steps of monitoring and producing at spaced intervals along the conveying direction and length of said confining wall and at spaced intervals transverse to said conveying direction;
separately comparing said signals with respective fixed reference signals correlated to the monitored characteristic and its position of monitoring to produce corresponding differential error signals; and
controlling at least one of the characteristics of chemical proportions, chemical quantities, fluid flow, fluid temperature, each in accordance with one or more of said reference error signals, in a fixed order of preference so as to maintain the fluid pressure within said film below 3 psig in said first section, within the range of 0 to 15 psig within said second section, the air film thickness not exceeding 0.010 inch, and the temperature of said fluid within the range of 160° to 180° F. within at least one of said sections.

20. A method of continuously molding an indefinite length web of synthetic resin foam products with a fluid film, comprising the steps of:

providing a fluid under pressure;
forming a tubular tunnel open at opposite entrance and exit ends by providing interconnected bottom, top and opposed side confining walls, with said tunnel generally having the cross sectional shape of the product;
passing the fluids through the confining walls to form a thin film fluid processing and bearing film envelope along the entire tunnel;

providing at least two separate chemicals that when mixed will react to foam and produce a synthetic resin foam;

mixing and depositing said chemicals on said bottom wall adjacent said entrance open end of said tunnel to be supported and evenly distributed in the transverse direction, with respect to the conveying direction, by said fluid film to form the beginning of the indefinite length web;

moving said chemicals as a web in a conveying direction parallel to the length of said tunnel through a first section of said tunnel from said entrance end while said chemicals rise and attain a fixed final height of synthetic foam resin that it substantially fills the cross section of said tunnel at the end of said first section;

conveying said foam resin web from said first section through a second section of said tunnel while controlling the temperature of said resin in said second section by controlling the temperature of said fluid to cure said resin into a substantially cured foam web to produce an indefinite length continuous web of cured synthetic foam resin;

controlling the characteristics of pressure, temperature and quantity of fluid in said film; and completely enveloping the web throughout said tunnel with the thin fluid film to prevent contact between said web and said confining walls, and further to process the resin according to the controlled characteristics of the fluid.

21. The method of claim 20, including the further steps of:

monitoring the quantity of mixed chemicals deposited at the entrance end and producing a correlated signal;

monitoring the proportion of mixed chemicals deposited at said entrance end and producing a correlated signal;

monitoring the flow of fluid within said thin film and producing a correlated signal;

monitoring the temperature of the fluid producing said film and producing a correlated signal;

monitoring the linear speed with which said web exits from said exit end of said tunnel and producing a correlated signal; and controlling the characteristics of chemical proportions, chemical quantities, fluid flow, linear web speed exiting from said tunnel, and fluid temperature.

22. The method of claim 21, in including conducting said steps of monitoring the flow of fluid and monitoring the temperature at spaced intervals along the conveying direction and at spaced intervals transverse to said conveying direction.

23. The method of claim 22, including comparing said signals with respective fixed reference signals correlated to the monitored characteristics and the position of monitoring to produce corresponding differential error signals; and automatically conducting said step of controlling in accordance with said error signals.

24. The method of claim 23, further including performing said step of controlling so that fluid film does not exceed 0.010 inch thick, as measured perpendicular to said confining walls, between said product and said confining wall at least within said second and third sections.

25. Apparatus for continuously processing an endless web moving in the longitudinal direction of the web comprising:

a base;

a first, generally planar, normally stationary, process surface mounted on said base;

a second, generally planar normally stationary, process surface mounted on said base to be spaced from and parallel to said first process surface;

each of said first and second process surfaces being composed of a plurality of sections serially arranged in longitudinal direction of the apparatus corresponding to the processing direction with an entrance end and an exit end of the web;

a plurality of holes extending over substantially the entire first and second process surfaces in a fixed pattern;

means operatively associated with said process surfaces forming a separate plenum chamber for each of said surface sections on the side of each of said surfaces opposite from the other surface so that all of said holes within each surface section open up into their corresponding plenum chamber; and means operatively associated with said plenum chambers for supplying pressurized fluid separately to each of said plenum chambers so that the fluid will exit from said holes and form fluid films respectively along said process surfaces sufficient to form an anti-friction fluid bearing for the web.

26. The apparatus of claim 25, including side supports closing the side space between each longitudinal side of the first and second process surfaces to form therewith a generally four-sided closed stationary tube extending for substantially the full longitudinal length of the apparatus and being open at opposed entrance and exit ends.

27. The apparatus of claim 25 including means operatively associated with said surfaces for continuously feeding a first endless sheet along and coextensive with the first surface, for continuously feeding a second endless sheet along and coextensive with the second surface, and for sealing the adjacent longitudinal sides of the sheets at least throughout a substantial length of the apparatus to prevent the foamable chemicals from escaping through the sides from between the sheets.

28. The apparatus of claim 25, including partition means for dividing said plenum chambers into fluid separated and independent sections serially arranged across the transverse dimension of said apparatus, for having different fluid characteristics, respectively.

29. The apparatus of claim 25, including said fluid supplying means being a single multi-stage compressor for compressing air and producing high temperature, high pressure air.

30. The apparatus of claim 25, including feeding means operatively associated with said process surfaces for engaging the endless web and for continuously moving the web through the apparatus;

means operatively associated with said process surfaces for depositing foamable chemicals at said entrance end of the apparatus to produce a continuous web of synthetic foam.

31. The apparatus of claim 30 including means operatively associated with said surfaces for continuously feeding a first endless sheet along and coextensive with the first surface, for continuously feeding a second endless sheet along and coextensive with the second surface, and for sealing the adjacent longitudinal sides of the sheets at least throughout a substantial length of the apparatus to prevent the foamable chemicals from escaping through the sides from between the sheets.

32. The apparatus of claim 30, wherein each of said sections is identical in size and shape and includes means operatively associated with it for connection to an adjacent section in a releasable manner so that the sections may be assembled in any desired pattern.

33. The apparatus of claim 30, including means operatively associated with said apparatus for separately monitoring the temperature of the fluid for each surface section and providing a correlated temperature monitor signal;

separate means operatively associated with each of said plenum chambers for controlling the temperature of the fluid being supplied to its plenum chamber in accordance with a temperature control signal;

central monitor and control means operatively associated with said apparatus for receiving all of said monitor signals, comparing said monitor signals respectively to separate fixed reference signals and producing respective control signals correlated to the comparison, and for selectively changing said reference signals.

34. The apparatus of claim 30, wherein said first process surface and said second process surface are within the range of 20 to 100 feet in length and at least 8 feet in width; and each said first and second surfaces being composed of at least 10 sections; and said holes being approximately 0.030 inch in diameter with said fixed pattern being a rectangular grid of holes 3 inches on center.

35. The apparatus of claim 30, including means operatively associated with said apparatus for separately monitoring the volume flow rate of fluid to each plenum chamber and producing a corresponding flow rate monitor signal;

central monitor and control means operatively associated with said apparatus for receiving all of said monitor signals, comparing said monitor signals respectively to separate fixed reference signals, and producing respective control signals correlated to the comparison, and for selectively changing said reference signals; and separate means operatively associated with each of said plenum chambers for controlling the flow rate of fluid to its plenum in response to a flow rate control signal.

36. The apparatus of claim 30, including means operatively associated with said apparatus for separately monitoring the power used to drive said feeding means and producing a corresponding feed power monitor signal;

means operatively associated with said apparatus for monitoring the withdrawal rate of product from the apparatus and producing a corresponding withdrawal rate monitor signal;

central monitor and control means operatively associated with said apparatus for receiving all of said monitor signals, comparing said monitor signals respectively to at least one fixed reference signal, and producing a feed control signal correlated to the comparison, and for selectively changing said reference signal;

means operatively associated with said feeding means for controlling the drive speed of said feeding means to thereby control the withdrawal rate and curing of the product being withdrawn from said apparatus in response to said feed control signal;

37. The apparatus of claim 30, wherein said second process surface is mounted for movement toward and away from said first process surface; and including power means operatively associated with said first and second process surfaces for moving said second surface away from said first surface to a position spaced sufficiently from said first surface for cleaning and repair, and for rigidly holding said second surface at a fixed spacing from said first surface throughout their lengths within a range of spacings corresponding to the desired process spacing;

said power means including fluid piston and cylinders for said sections of said second surface and means operatively associated with said apparatus separately monitoring the reaction pressure of the product tending to separate the first and second surfaces and producing corresponding clamp pressure monitor signals correlated to the molding pressure of the foaming product;

central monitor and control means operatively associated with said apparatus for receiving all of said monitor signals, comparing said monitor signals to fixed reference signals and producing respective control signals correlated to the comparison; and means for changing at least one of the characteristics of the fluid and foamable chemicals.

38. The apparatus of claim 30, including means operatively associated with said apparatus for separately monitoring the volume flow rate of fluid to each plenum chamber and producing a corresponding flow rate monitor signal;

central monitor and control means operatively associated with said apparatus for receiving all of said monitor signals, comparing said monitor signals respectively to separate fixed reference signals, producing respective control signals correlated to the comparison, and for selectively changing said reference signal;

said depositing means including selectively actuable control means for changing the formulation of said chemicals, and selectively actuable control means for changing the volume depositing rate of said chemicals;

said feeding means including selectively actuable control means for changing the feed speed of said web through the apparatus;

said means supplying pressurized fluid including selectively actuable control means for changing the fluid pressure in at least some of said plenum chambers;

selectively actuable control means for changing the spacing between said first and second process surfaces; and means operatively associated with said apparatus for actuating at least one of said selectively actuable control means in response to said flow rate control signal.

39. The apparatus of claim 30, including means operatively associated with said apparatus for separately monitoring the power used to drive said feed means and producing a corresponding feed power signal;

central monitor and control means operatively associated with said apparatus for receiving said feed power monitor signal, comparing said feed power monitor signal to at least one fixed reference signal, and producing a feed power differential control signal correlated to the comparison, and selectively changing said reference signal;

said depositing means including selectively actuable control means for changing the formulation of said chemicals, and selectively actuable control means for changing the volume depositing rate of said chemicals;

said feeding means including selectively actuable control means for changing the feed speed of said web through the apparatus;

said means supplying pressurized fluid including selectively actuable control means for changing the fluid pressure in at least some of said plenum chambers;

selectively actuable control means for changing the spacing between said first and second process surfaces; and means operatively associated with said apparatus for actuating at least one of said selectively actuable control means in response to said feed control signal.

40. The apparatus of claim 30, wherein said second process surface is mounted for movement toward and away from said first process surface; and including fluid piston and cylinder power means operatively associated with said first and second process surfaces for moving said second surface away from said first surface to a position spaced sufficiently from said first surface for cleaning and repairing, and for rigidly holding said second surface at a fixed spacing from said first surface throughout their lengths within a range of adjustable spacings corresponding to a desired process spacing at a fixed pressure within said cylinders so that when the forces of the materials between said surfaces tending to separate said surfaces exceed the forces produced by the pressure within said cylinders, said cylinders will yield to increase the spacing between said surfaces to avoid damage to the apparatus upon encountering excess pressure.

41. The apparatus of claim 30, including means operatively associated with said apparatus for separately monitoring the temperature of the fluid for each surface section and providing a correlated temperature monitor signal;

central monitor and control means operatively associated with said apparatus for receiving all of said monitor signals, comparing said monitor signals respectively to separate fixed reference signals and producing respective control signals correlated to the comparison, and for selectively changing said reference signals;

separate means operatively associated with each of said plenum chambers for controlling the temperature of the fluid being supplied to its plenum chamber in accordance with a temperature control signal.

42. The apparatus of claim 41, including means operatively associated with said apparatus for separately monitoring the volume flow rate of fluid to each plenum chamber and producing a corresponding flow rate monitor signal;

said central monitor and control means operatively associated with said apparatus for receiving said flow rate monitor signals, comparing said flow rate monitor signals respectively to separate fixed reference signals and producing corresponding flow rate control signals;

means operatively associated with said plenums for controlling the flow rate of said fluid in response to said flow rate control signal.

43. The apparatus of claim 42, including means operatively associated with said apparatus for separately monitoring the power used to drive said feeding means and producing a corresponding feed power monitor signal;

said central monitor and control means receiving said feed power monitor signals, comparing said feed power monitor signal to a separate fixed reference signal, and producing a control power signal correlated to the comparison; and separate means operatively associated with said feeding means for varying the feed speed in response to the feed power control signal.

44. The apparatus of claim 30, including means operatively associated with said apparatus for separately monitoring the pressure of the fluid for each process surface section and providing a corresponding pressure monitor signal;

central monitor and control means operatively associated with said apparatus for receiving all of said monitor signals, comparing said monitor signals respectively to separate fixed reference signals, and producing respective control signals correlated to the comparison, and for selectively changing said reference signals; and separate means operatively associated with each of said plenum chambers for controlling the pressure of the fluid being supplied to its plenum chamber in accordance with a pressure control signal.

45. The apparatus of any one of claims 41–36 wherein said central monitor and control means has a plurality of visual indicia visibly indicating selected monitor signals.

46. The apparatus of claim 41, including means operatively associated with said apparatus for separately monitoring the volume flow rate of fluid to each plenum chamber and producing a corresponding flow rate monitor signal;

said central monitor and control means operatively associated with said apparatus for receiving said flow rate signals, comparing said flow rate monitor signals respectively to separate fixed reference signals and producing corresponding flow rate control signals;

said depositing means including selectively actuable control means for changing the formulation of said chemicals, and selectively actuable control means for changing the volume depositing rate of said chemicals;

said feeding means including selectively actuable control means for changing the feed speed of said web through the apparatus;

said means supplying pressurized fluid including selectively actuable control means for changing the fluid pressure in at least some of said plenum chambers;

selectively actuable control means for changing the spacing between said first and second process surfaces; and means operatively associated with said apparatus for receiving said flow rate control signal and actuating one of said selectively actuable control means for control in accordance with said flow rate control signal.

47. A process containment apparatus for a moving product, comprising:
a base;
a containment wall mounted on said base;
means operatively associated with said containment wall for holding a product along and in close proximity to said containment wall;
means operatively associated with said containment wall for producing a pressurized fluid film between said containment wall and the product so as to be in direct contact with the product being moved by said feeding means for direct transfer of the fluid film properties to the product;
means operatively associated with said means for providing the fluid film to sense fluid flow rate, fluid film temperature, and fluid pressure and to produce separate correlated monitor signals;
means operatively associated with said sensing means for receiving said separate monitor signals and individually comparing said separate monitor signals to a plurality of respective fixed reference signals so as to produce differential control signals; and
separate means operatively associated with said means for supplying the fluid film to control the flow rate, temperature and the pressure of the fluid in response to the control signals, respectively.

48. The apparatus of claim 47, wherein said containment wall is divided into a plurality of adjacent sections, and wherein there is a separate group of sensing means and control means for the fluid being supplied to each of said sections for independent operation in accordance with control signals derived by a separate set of reference signals for each of said sections so as to vary the fluid characteristics of flow rate, temperature and pressure from section to section in a fixed relationship.

49. A process containment apparatus for a moving product, comprising:
a base;
a containment wall mounted on said base;
means operatively associated with said containment wall for holding a product along and in close proximity to said containment wall;
means operatively associated with said containment wall for producing a pressurized fluid film between said containment wall and the product so as to be in direct contact with the product being moved by said feeding means for direct transfer of the fluid film properties to the product; and
means operatively associated with said wall for collecting the fluid from the fluid film as it moves away from said wall and the product and for recirculating said collected fluid back to the means for producing the fluid film.

50. The apparatus of claim 47, including means operatively associated with said control means for producing product control signals; means operatively associated with said wall for continuously depositing a moving web of foamable synthetic resin to be formed by said fluid film and wall, with the depositing means varying the lay down quantity rate in accordance with said product control signal.

51. An apparatus for processing a continuous, indefinite length web of material with a thin film of processing fluid, comprising:
a rigid confining wall elongated in the conveying direction, having a substantially uniform width along the conveying direction, and a substantially planar rigid working surface;
means for moving the web along said working surface in said conveying direction to coincide with its indefinite length;
said confining wall having a through slot elongated in the direction of conveying and being generally along the center of said confining wall; and
plenum means on the side of said confining wall opposite from said working surface for passing pressurized processing fluid through said slot to form a thin film of processing fluid entirely between said web and said working surface to directly contact said web, space said web a small distance from and parallel to said working surface, and provide laminar flow of working fluid from said slot generally laterally in each direction from the center line of said wall outwardly and transversely to said web.

52. The apparatus of claim 51, further including means to sense a property of said film and produce a correlated signal; means for comparing said signal to a reference signal and producing a differential signal; means for controlling a property of said film in response to said differential signal.

53. The apparatus of claim 52, wherein said slot is skewed with respect to the center line of said confining wall and conveying direction to vary the impingement point of said fluid passing through said slot onto said web along the length of said web.

54. The apparatus of claim 52, wherein said slot is skewed with respect to the center line of said confining wall and conveying direction to vary the impingement point of said fluid passing through said slot onto said web along the length of said web.

55. The apparatus of claim 52, wherein said slot is approximately 0.015 inch wide.

56. A product processing apparatus, comprising:
means for forming a zone having confining walls including one confining wall with a moving thin fluid film;
means for moving the product being processed through the zone of confining walls with the moving thin film of fluid in direct contact with the product;
means for separately measuring the temperature, pressure and flow of fluid forming said moving thin film of fluid and producing correlated signals;
means providing reference temperature, pressure and flow signals; and
means for receiving the reference signals and receiving the measured signals, and respectively comparing corresponding signals to produce correlated comparison signals, and said means for changing the pressure, temperature and flow of the fluid being responsive to said comparison signals to correspondingly adjust the temperature, pressure and flow of the fluid so that said measure signals will more closely approach said reference signals.

57. A product processing apparatus, comprising means for forming a zone having confining walls including one confining wall with a moving thin fluid film;
means for moving the product being processed through the zone of confining walls with the moving thin film of fluid in direct contact with the product;
said confining wall comprising a plurality of separate and independent wall sections rigidly interconnected with each other;

said forming means separately providing fluid to each of said sections so that the fluid characteristics may be changed from one section to another;

means for changing the rate of flow and the temperature of the fluid in said moving thin film of fluid;

means for separately measuring the temperature, pressure and flow of the fluid forming said moving thin film of fluid and producing correlated signals;

means providing reference temperature, pressure and flow signals; and means for receiving the reference signals and receiving the measured signals, and respectively comparing corresponding signals to produce correlated comparison signals, and said means for changing the pressure, temperature and flow of fluid being responsive to said comparison signals to correspondingly adjust the temperature, pressure and flow of fluid so that said measured signals will more closely approach said reference signals.

58. The apparatus of claim 56 or 57, wherein said measured signals, and comparison signals are contained within a closed self-regulating feedback control loop.

59. A product processing apparatus, comprising means for forming a zone having confining walls including one confining wall with a moving thin fluid film;

means for moving the product being processed through the zone of confining walls with the moving thin film of fluid in direct contact with the product;

said confining walls which have the moving thin fluid film comprising a plurality of separate and independent wall sections rigidly interconnected with each other;

said confining wall comprising a plurality of separate and independent wall sections rigidly interconnected with each other;

releasable fastener means providing the sole interconnection between said adjacent sections, so that the size of said confining wall may be selectively changed by adding and subtracting sections; and said fastening means resiliently interconnecting adjacent sections to accommodate expansion of the product and permit relative movement of adjacent sections away from each other.

60. A product processing apparatus, comprising means for forming a zone having confining walls including one confining wall with a moving thin fluid film;

means for moving the product being processed through the zone of confining walls with the moving thin film of fluid in direct contact with the product;

said confining wall with the fluid film comprising a plurality of separate and independent wall sections rigidly interconnected with each other;

releasable fastener means providing the sole interconnection between said adjacent sections, so that the size of said confining wall may be selectively changed by adding and subtracting sections; and said fastening means permitting movement of said sections away from each other a distance sufficient to permit maintenance and inspection between said adjacent sections.

61. The apparatus of claim 59 or 60, including separate spacer means clamped between vertically adjacent sections.

62. The apparatus of claim 61, including a plurality of said spacers of different size, whereby selected one of said spacers may be clamped between adjacent sections, so as to accommodate corresponding different size products.

63. The apparatus of claim 59 or 60, wherein said releasable fastener means are adjustable so as to correspondingly change the vertical spacing between vertically adjacent sections to accommodate different sized products.

64. A product processing apparatus, comprising:

means for forming a zone having confining walls including one confining wall with a moving thin fluid film;

means for moving the product being processed through the zone of confining walls with the moving thin film of fluid in direct contact with the product;

said confining wall with the fluid film comprising a plurality of separate and independent wall sections rigidly interconnected with each other;

said forming means separately providing fluid to each of said sections so that the fluid characteristics may be changed from one section to another;

means for changing the rate of flow and the temperature of the fluid in said moving thin film of fluid;

means for measuring the power consumed in moving the product through said zone by said moving means, and producing a correlated power consumption signal; and said means for varying the pressure, temperature and flow of fluid receiving said power signal and producing a change in the pressure, temperature and flow in accordance with the value of said power signal.

65. A product processing apparatus, comprising means for forming a zone having confining walls including one confining wall with a moving thin fluid film;

means for moving the product being processed through the zone of confining walls with the moving thin film film of fluid in direct contact with the product;

said confining wall comprising a plurality of separate and independent wall sections rigidly interconnected with each other;

said forming means separately providing fluid to each of said sections so that the fluid characteristics may be changed from one section to another; and means for changing the rate of flow and the temperature of the fluid in said moving thin film of fluid.

66. The apparatus of claim 65, further including:

means for measuring at least one of the temperature characteristics, pressure characteristics and flow characteristics of the fluid forming said moving thin film of fluid and producing a correlated characteristic signal;

means providing a reference signal correlated to said at least one characteristic; and means for receiving the reference signal and receiving the measured characteristic signal and respectively comparing the corresponding reference signal and characteristic signal to product a correlated comparison signal, and said means for changing being responsive to said comparison signal to correspondingly adjust said at least one characteristic so that the measured characteristic signal will more closely approach the corresponding reference signal.

* * * * *